(12) United States Patent
Nemoto et al.

(10) Patent No.: US 10,629,887 B2
(45) Date of Patent: Apr. 21, 2020

(54) SECONDARY BATTERY

(71) Applicant: TOYOTA JIDOSHA KABUSHIKI KAISHA, Toyota-shi, Aichi-ken (JP)

(72) Inventors: Yuta Nemoto, Toyota (JP); Toshinori Okura, Toyota (JP); Takeshi Iida, Toyota (JP); Noriyuki Maruyama, Toyota (JP); Hiroaki Yoshida, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 557 days.

(21) Appl. No.: 15/149,676

(22) Filed: May 9, 2016

(65) Prior Publication Data
US 2016/0336579 A1  Nov. 17, 2016

(30) Foreign Application Priority Data

May 14, 2015 (JP) ................................ 2015-099020
Nov. 12, 2015 (JP) ............................... 2015-221957

(51) Int. Cl.
*H01M 2/34* (2006.01)
*H01M 2/30* (2006.01)
(Continued)

(52) U.S. Cl.
CPC ............. *H01M 2/345* (2013.01); *H01M 2/30* (2013.01); *H01M 10/425* (2013.01);
(Continued)

(58) Field of Classification Search
CPC .... H01M 2220/20; H01M 2/30; H01M 2/345; H01M 10/48; H01M 2010/4271; H01M 10/425; H02J 2007/0037; H02J 7/0031
See application file for complete search history.

(56) References Cited

U.S. PATENT DOCUMENTS 6,342,826 B1    1/2002  Quinn et al.
6,403,250 B1 *  6/2002  Azema ................ H01M 2/1229
                                        200/512
(Continued)

FOREIGN PATENT DOCUMENTS

JP       2000-251873 A     9/2000
JP       2000315493 A     11/2000
(Continued)

OTHER PUBLICATIONS

English Translation of communication dated Mar. 15, 2018, from the State Intellectual Property Office of the P.R.C in counterpart application No. 201610316916.7.

*Primary Examiner* — Mayla Gonzalez Ramos
(74) *Attorney, Agent, or Firm* — Sughrue Mion, PLLC

(57) ABSTRACT

When a temperature inside a secondary battery becomes high and a gas pressure inside a battery case increases, an inversion plate is pressed due to the gas pressure so as to project and curve in a projecting manner toward an external terminal board. Due to such a deformation, a load is transmitted to a current interruption piece via a load transmission portion. At this time, due to a pushing-up force of the load transmission portion, a vulnerable breaking portion forming part of a peripheral edge of the current interruption piece breaks, so that the current interruption piece is displaced to bend in a V-shape via a folding portion. As a result, the secondary battery is brought into an unusable state. Such a configuration can attain simplification of a structure to interrupt a current.

10 Claims, 19 Drawing Sheets

(51) Int. Cl.
*H01M 10/42* (2006.01)
*H02J 7/00* (2006.01)

(52) U.S. Cl.
CPC ............... *H01M 2010/4271* (2013.01); *H01M 2200/20* (2013.01); *H02J 7/0031* (2013.01); *H02J 2007/0037* (2013.01)

(56) References Cited

U.S. PATENT DOCUMENTS

| | | |
|---|---|---|
| 2010/0072975 A1 | 3/2010 | Hori |
| 2016/0315308 A1* | 10/2016 | Hirose ................. H01M 2/345 |

FOREIGN PATENT DOCUMENTS

| | | |
|---|---|---|
| JP | 2001-84880 A | 3/2001 |
| JP | 2014-096225 A | 5/2014 |
| JP | 2014-137891 A | 7/2014 |
| JP | 2015-060751 A | 3/2015 |
| KR | 2002-0062217 A | 7/2002 |
| KR | 10-2010-0034710 A | 4/2010 |
| TW | 531910 B | 5/2003 |
| WO | 2015/040471 A1 | 3/2015 |

* cited by examiner

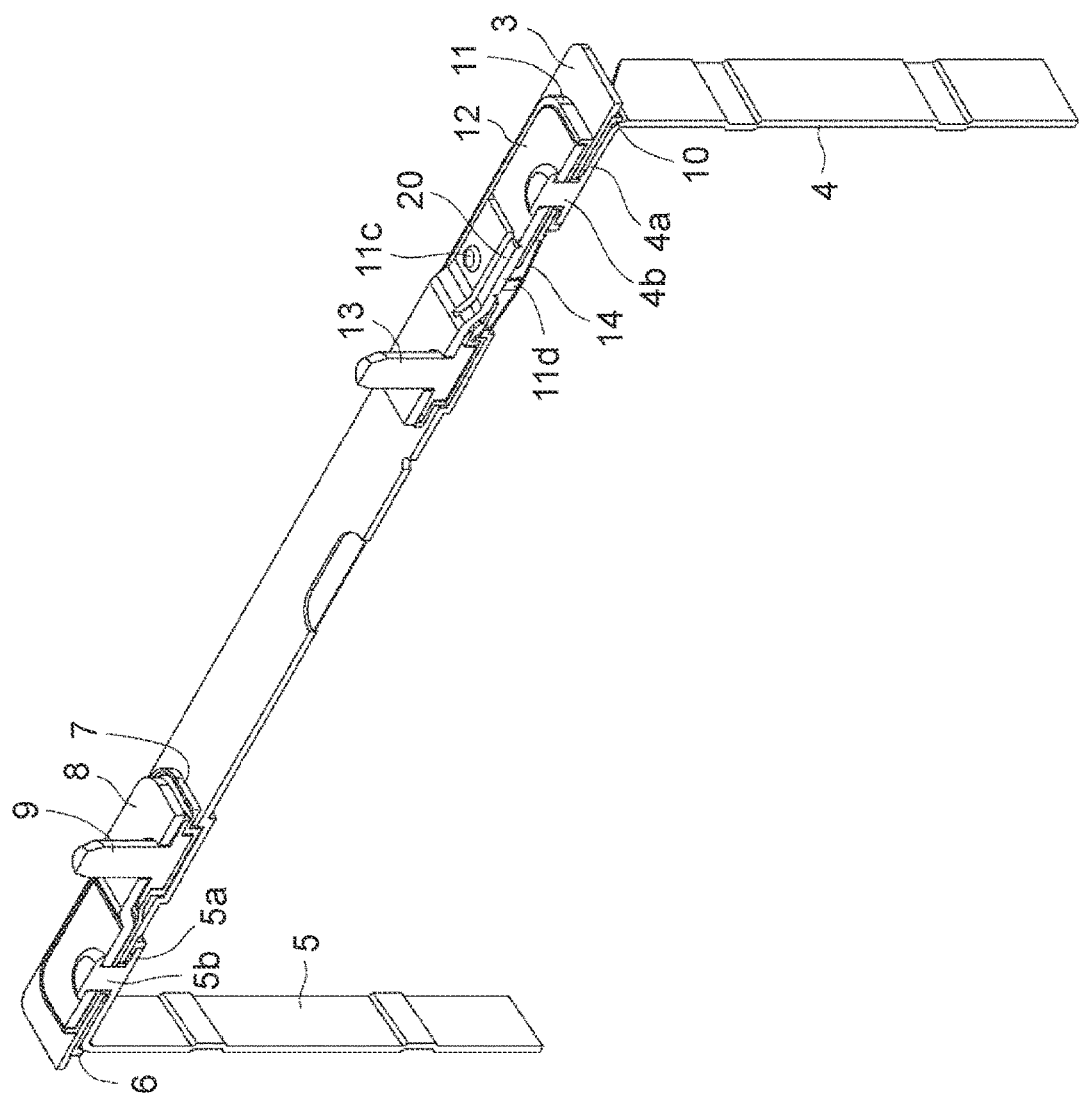

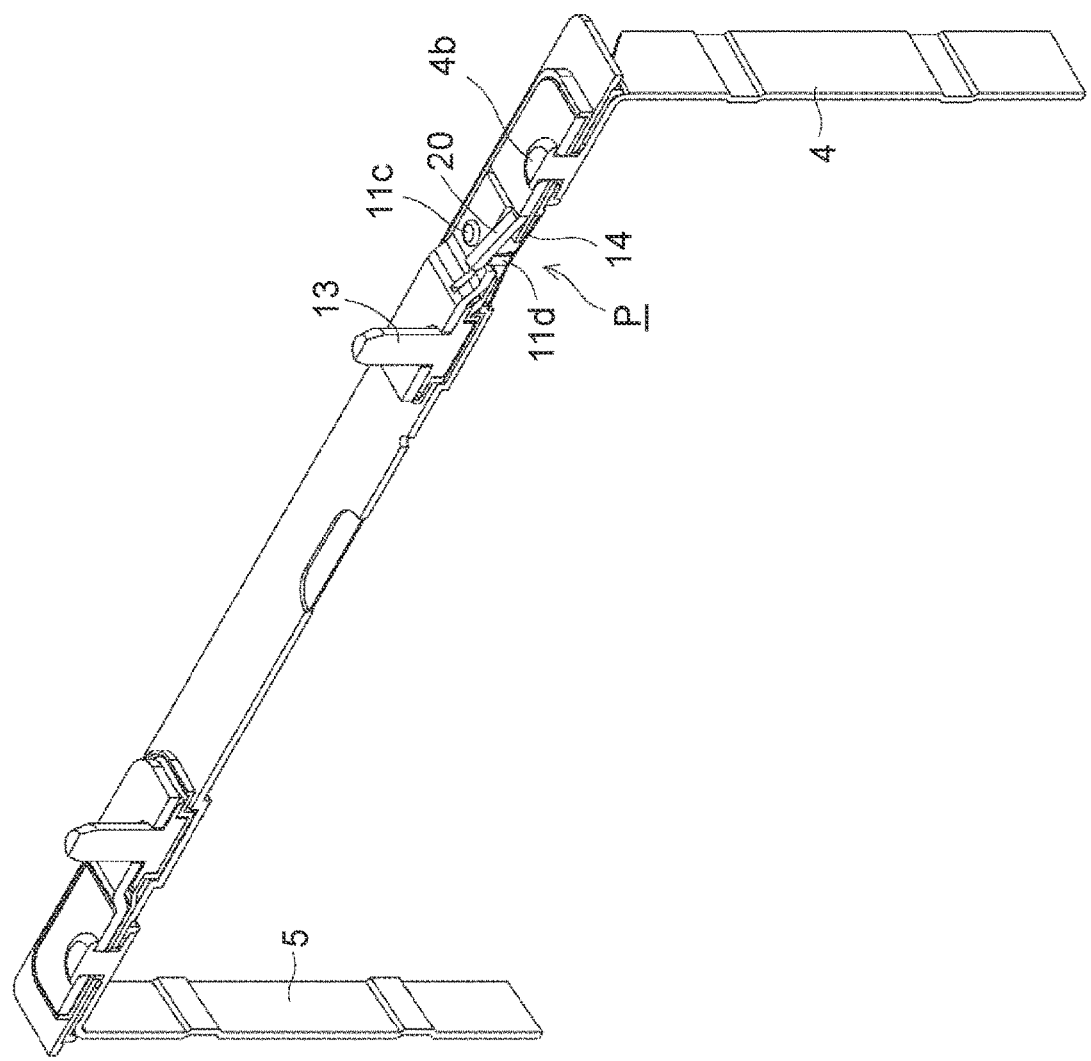
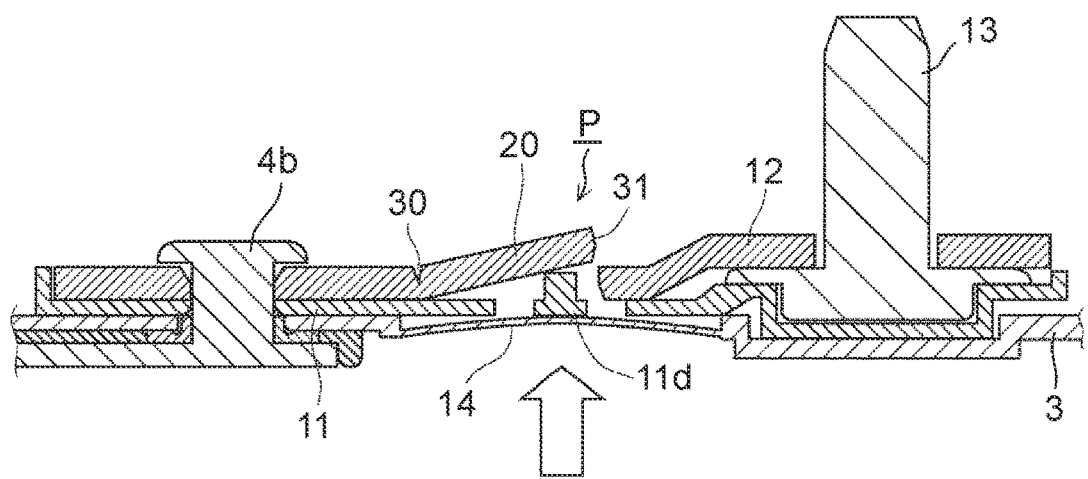

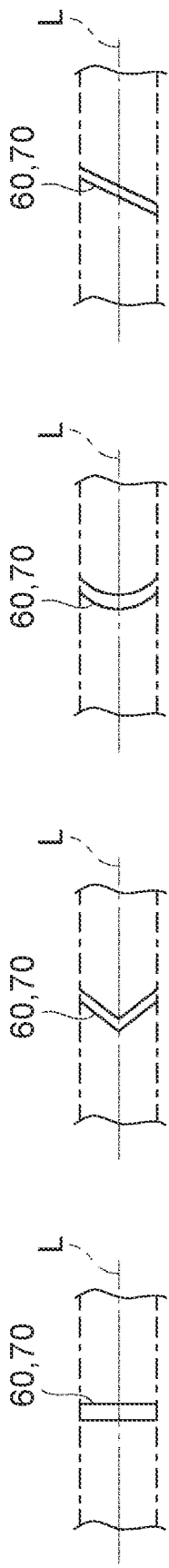

SECONDARY BATTERY

INCORPORATION BY REFERENCE

The disclosure of Japanese Patent Application No. 2015-099020 and 2015-221957 filed on May 14, 2015 and Nov. 12, 2015 including the specification, drawings and abstract is incorporated herein by reference in its entirety.

BACKGROUND OF THE INVENTION

1. Field of the Invention

The present invention relates to a secondary battery including a current interruption mechanism.

2. Description of Related Art

Conventionally, a technique in such a field is described in Japanese Patent Application Publication No. 2014-137891 (JP 2014-137891 A). In a secondary battery described in this publication, a current interruption mechanism is configured such that a positive current-collector projection formed in a cylindrical shape in an upper end of a positive collector terminal inside the battery is joined to a top portion of an inverting terminal having a bowl shape and connected to a fastening member (a terminal) that enables external connections. Furthermore, a top plate portion is placed in a top portion of the positive current-collector projection via a vulnerable portion, and the top plate portion has a passage hole that reduces a pressure difference between an inner side of the battery and a gap between the inverting terminal and the top plate portion.

In such a current interruption mechanism, when the battery becomes a high temperature at the time of use, a gas pressure inside the battery increases and gas inside the battery pushes up the inverting terminal through the passage hole, so that the inverting terminal warps upward. This breaks the vulnerable portion, so that the top plate portion joined to the inverting terminal is separated from the positive current-collector projection. As a result, the positive collector terminal placed inside the battery is electrically disconnected from the fastening member (terminal) for external connections, so that current supply to the fastening member is stopped and the battery is brought into an unusable state.

SUMMARY OF THE INVENTION

Since the aforementioned conventional secondary battery has an inversion plate on an electric conductive path, it is necessary to weld the inversion plate to the collector terminal in order to secure electric conductivity. If the inversion plate deforms due to heat at the time of the welding, a working pressure of the current interruption mechanism may not reach a working pressure predetermined at first.

The present invention provides a secondary battery that surely interrupts a current at a working pressure predetermined at first.

In a secondary battery of one aspect of the present invention, an external terminal board is placed on a cover portion of a battery case via an insulator, and the external terminal board has an electrical path that is conductive from a collector terminal inside the battery case to a terminal. A first displacement portion displaceable so as to project toward the external terminal board at a predetermined pressure inside the battery case is provided in the cover portion, a second displacement portion projectable outward so as to interrupt the electrical path is provided in the external terminal board, and a load transmission portion configured to transmit displacement of the first displacement portion to the second displacement portion is placed between the first displacement portion and the second displacement portion.

When a temperature inside the secondary battery becomes high and a gas pressure inside the battery case increases, the first displacement portion is pressed due to the gas pressure so as to project toward the external terminal board. Due to such a displacement, a load is transmitted to the second displacement portion via the load transmission portion. At this time, the second displacement portion breaks due to a pushing-up force of the load transmission portion. The breakage interrupts the electrical path of the external terminal board, so that no current flows into the external terminal board.

When a case internal pressure is normal, a conductive path is secured by the collector terminal and the external terminal board, so it is not necessary to weld the inversion plate. Accordingly, the inversion plate does not deform due to heat, so an originally designed working pressure can be used as a working pressure of the current interruption mechanism.

Further, the second displacement portion includes a vulnerable breaking portion extended on the external terminal board so as to interrupt the electrical path. By employing a vulnerable breaking portion, it is possible to surely interrupt a current.

Further, the load transmission portion is made of an insulating material and is integrally provided with the insulator. With such a configuration, even if the battery case is made of a conductive metal, no current flows into the battery case after the breakage of the second displacement portion. This makes it possible to extract electric charges from the external terminal board, which makes it easy to restart electric conduction.

Further, the insulator is fixed to the external terminal board via a caulking portion, and the load transmission portion is placed near the breaking portion. With such a configuration, it is possible to surely transmit a pushing-up force of the load transmission portion to the breaking portion by use of the caulking portion as a fixed point, thereby making it possible to surely break the breaking portion.

Further, the second displacement portion is formed to be smaller than a width of the external terminal board due to slit portions extended from an outer periphery of the external terminal board. By employing the slit portions, it is possible to easily form a narrow electrical path in the external terminal board, and by narrowing a width of the electrical path to be interrupted, the interruption can be performed easily. This facilitates downsizing of the second displacement portion, thereby making it easy to displace the second displacement portion.

Further, a fastening portion electrically connected to the collector terminal inside the battery case is fixed to the external terminal board, the terminal projecting outside is connected to the external terminal board, the second displacement portion placed between the fastening portion and the terminal is formed in the external terminal board and constituted by first slit portions extended from a peripheral edge of the external terminal board so as to be perpendicular to a reference axis that passes through the fastening portion and the terminal, and second slit portions extended in parallel with the reference axis so as to communicate with respective first slit portions, and the first slit portions and the second slit portions are placed in pairs in a mirror symmetrical manner across the reference axis. With such a configuration, it is possible to easily form a narrow electrical path in the external terminal board, and by narrowing a width of the electrical path to be interrupted, the interruption can be performed easily.

Further, the breaking portion is extended perpendicularly to the reference axis over the pair of second slit portions, a folding portion extended in parallel with the breaking portion is extended perpendicularly to the reference axis over the pair of second slit portions, and the second displacement portion is constituted by the first slit portions, the second slit portions, the breaking portion, and the folding portion.

Further, a third slit portion is further provided on the reference axis so as to be separated from the second slit portions and to be extended in parallel with the first slit portions, the breaking portion is extended from an end portion of the third slit portion to an end portion of the second slit portion, a folding portion extended in parallel with the third slit portion is extended perpendicularly to the reference axis over the pair of second slit portions, and the second displacement portion is constituted by the first slit portions, the second slit portions, the third slit portion, the breaking portion, and the folding portion. Since a direction in which the load transmission portion presses the external terminal board is the same as a direction in which the second displacement portion breaks, the second displacement portion is easily displaced. Accordingly, it is possible to surely interrupt a current.

Further, the first displacement portion is provided integrally with the cover portion.

The abovementioned secondary battery includes a malfunction detection portion, the load transmission portion includes a pushing-up portion that makes contact with the second displacement portion so as to push up the second displacement portion, and a projecting portion that projects outward through a through-hole formed in the second displacement portion, and when the load transmission portion is pushed up due to displacement of the first displacement portion so that the second displacement portion projects outward so as to interrupt the electrical path, the projecting portion comes into contact with the malfunction detection portion.

The abovementioned secondary battery includes a malfunction detection portion, and when the second displacement portion projects outward so as to interrupt the electrical path, the second displacement portion comes into contact with the malfunction detection portion.

According to the present invention, it is possible to surely interrupt a current by displacing the second displacement portion at a working pressure predetermined at first.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a perspective view illustrating an essential part of the secondary battery;

FIG. 3 is a sectional view illustrating a current interruption mechanism;

FIG. 6 is a perspective view illustrating a state where the current interruption mechanism works;

FIG. 7 is a sectional view illustrating a state where the current interruption mechanism works;

FIG. 15A is a plan view illustrating a modification of the breaking portion and the folding portion;

FIG. 15B is a plan view illustrating a modification of the breaking portion and the folding portion;

FIG. 15C is a plan view illustrating a modification of the breaking portion and the folding portion;

FIG. 15D is a plan view illustrating a modification of the breaking portion and the folding portion;

DETAILED DESCRIPTION OF EMBODIMENTS

Hereinafter, with reference to the drawings, preferred embodiments of a secondary battery according to the invention will be described in detail.

Figure 1:
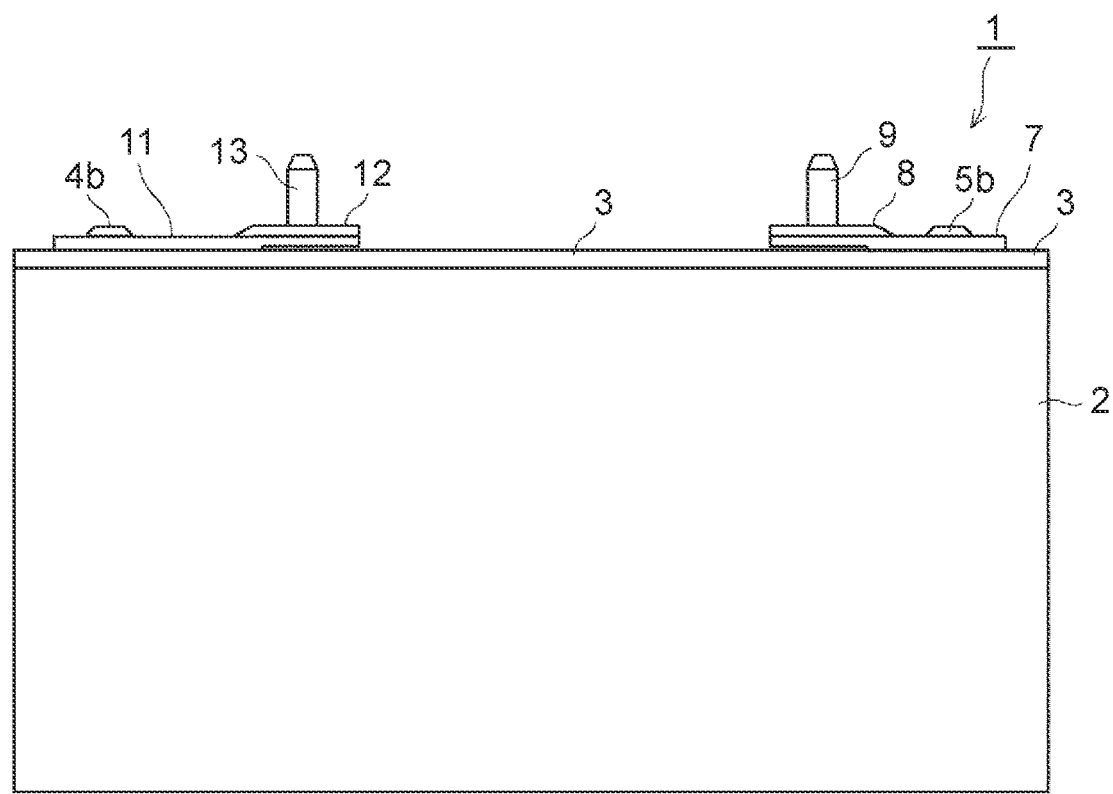
FIG. 1 is a front view illustrating one embodiment of a secondary battery according to the invention.

As illustrated in FIGS. 1 and 2, a secondary battery 1 includes a battery case 2 having an opening in its upper part, and a plate-shaped cover portion 3 for closing the opening of the battery case 2. An anode-side collector terminal 4 and a cathode-side collector terminal 5 are placed inside the battery case 2. An upper part of the anode-side collector terminal 4 is bent in an L-shape, and an upper end 4a thereof extending horizontally includes a columnar fastening portion 4b formed integrally therewith. Similarly, an upper part of the cathode-side collector terminal 5 is bent in an L-shape, and an upper end 5a thereof extending horizontally includes a columnar fastening portion 5b formed integrally therewith.

The upper end 5a of the cathode-side collector terminal 5 is placed on a back side of the cover portion 3 via an insulating member 6. In the meantime, a plate-shaped insulator 7 made of resin is placed on a front side of the cover portion 3, and an external terminal board 8 made of aluminum is placed on the insulator 7. The fastening portion 5b penetrates through the cover portion 3 and the insulator 7, and a top portion of the fastening portion 5b is caulked, so that the external terminal board 8 is fixed to the cathode-side collector terminal 5. Accordingly, even if an inversion plate 14 is not welded, a conductive path is secured by the cathode-side collector terminal 5, the external terminal board 8, and a terminal 9 at the time of normal use. Note that a bottom end of the terminal 9 is placed on the insulator 7 such that the terminal 9 penetrates through the external terminal board 8 so as to project outside.

Similarly, as illustrated in FIGS. 2 and 3, the upper end 4a of the anode-side collector terminal 4 is placed on the back side of the cover portion 3 via an insulating member 10. In the meantime, a plate-shaped insulator 11 made of resin is placed on the front side of the cover portion 3, and an external terminal board 12 made of aluminum is placed on the insulator 11. The fastening portion 4b penetrates through the cover portion 3 and the insulator 11, and a top portion of the fastening portion 4b is caulked, so that the external terminal board 12 is fixed to the anode-side collector terminal 4. Note that a bottom end of a terminal 13 is placed on the insulator 11 such that the terminal 13 penetrates through the external terminal board 12 so as to project outside.

On an anode side, a circular inversion plate (a first displacement portion) 14 is provided integrally with the cover portion 3 made of aluminum, and the inversion plate 14 is formed with a thin thickness so as to be easily deformed. The inversion plate 14 is placed between the terminal 13 and the fastening portion 4b. A back surface of the inversion plate 14 is exposed inside the secondary battery 1, and the inversion plate 14 is displaced by a gas pressure generated inside the secondary battery 1.

Figure 4:
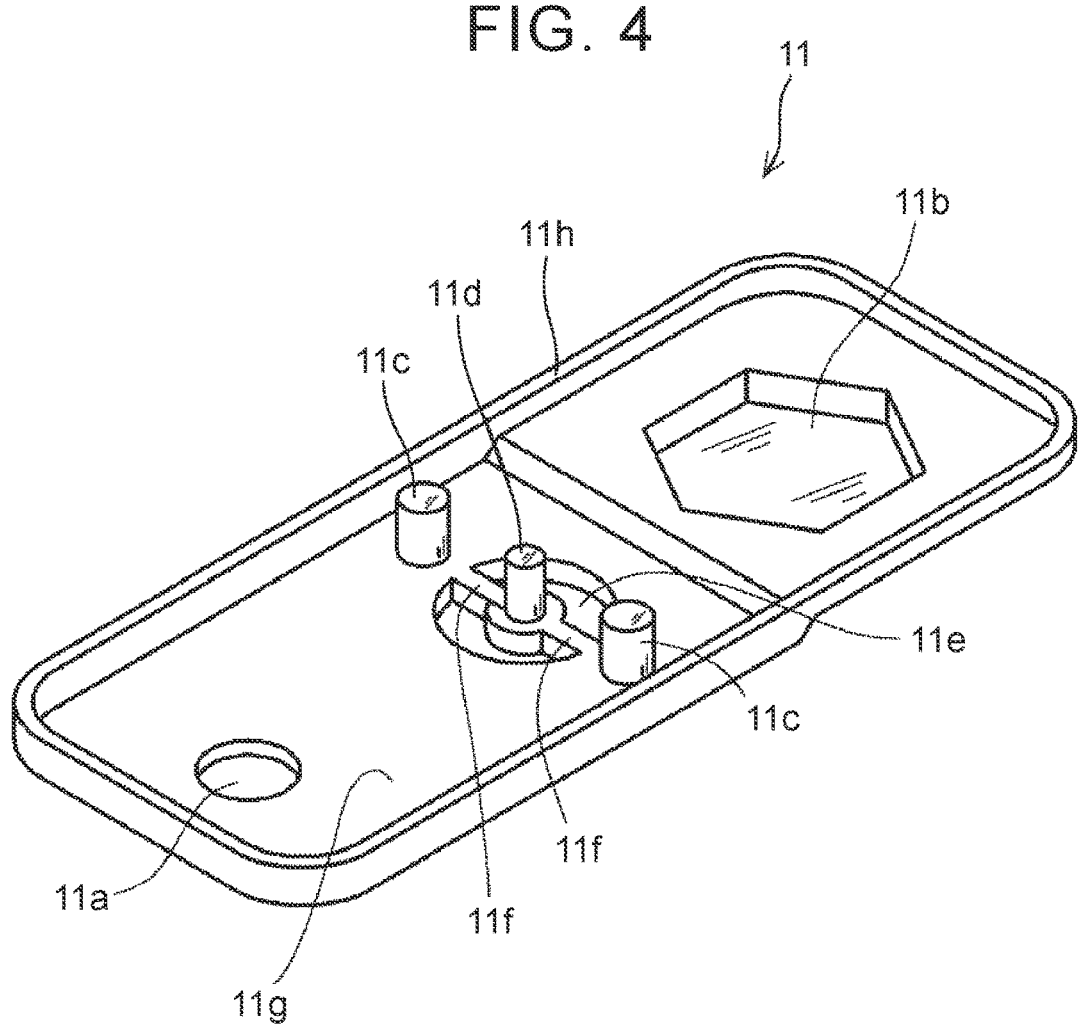
FIG. 4 is a perspective view illustrating an insulator.

As illustrated in FIGS. 3 and 4, the insulator 11 made of electrically insulative resin includes a through-hole 11a into which the fastening portion 4b is inserted, a recessed portion 11b on which a base end 13a of the terminal 13 is seated, columnar caulking portions 11c that penetrate through the external terminal board 12 so as to be fixed to the external terminal board 12, and a columnar load transmission portion 11d to be placed on the inversion plate 14. An edge portion 11h is provided so as to surround a base plate portion 11g of the insulator 11. The edge portion 11h surely fits the external terminal board 12 into the insulator 11.

The columnar load transmission portion 11d is placed in a center of a circular opening 11e formed between the through-hole 11a and the recessed portion 11b, and is connected to the base plate portion 11g of the insulator 11 by connection pieces 11f placed inside the opening 11e. By employing the connection pieces 11f, the load transmission portion 11d can be provided integrally with the insulator 11, and the load transmission portion 11d can be surely moved in an up-down direction inside the opening 11e. As an example in which the load transmission portion 11d can be provided integrally with the insulator 11, the load transmission portion 11d may be fixed to the insulator 11 with an adhesive or may be formed by use of injection molding. Note that the load transmission portion 11d may be fixed onto the inversion plate 14. Two connection pieces 11f are arranged on a straight line so as to sandwich the load transmission portion 11d. Since the load transmission portion 11d is provided integrally with the insulator 11, the number of components can be reduced, thereby making it easy to assemble the secondary battery 1.

Figure 5:
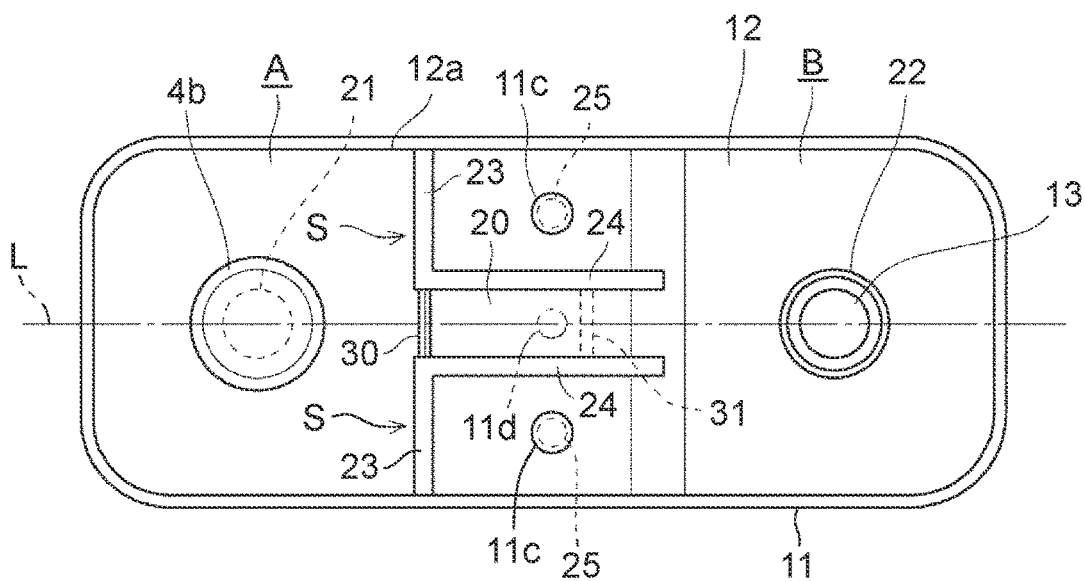
FIG. 5 is a plan view illustrating a state where the insulator is assembled to an external terminal board.

As illustrated in FIGS. 3 and 5, the external terminal board 12 having a rectangular shape includes a rectangular current interruption piece (a second displacement portion) 20 provided generally in a center thereof. The current interruption piece 20 forms, in the middle of the external terminal board 12, an electrical path of a current flowing into the terminal 13 from the fastening portion 4b, and is displaced so as to protrude outward. Due to slits S cut from a peripheral edge 12a of the external terminal board 12, the rectangular current interruption piece 20 is extended along a reference axis L with a width narrower than the external terminal board 12, generally in the center of the external terminal board 12.

The current interruption piece 20 is placed between a through-hole 21 into which the fastening portion 4b is inserted and a through-hole 22 into which the terminal 13 is inserted. The slits S having an L-shape are each constituted by a first slit portion 23 extended from the peripheral edge 12a of the external terminal board 12 so as to be perpendicular to the reference axis L passing through a center of the through-hole 21 and a center of the through-hole 22, and a second slit portion 24 extended in parallel with the reference axis L so as to communicate with the first slit portion 23.

Further, the first slit portions 23 and the second slit portions 24 are placed in pairs in a mirror symmetrical manner across the reference axis L. The pair of second slit portions 24 provided in parallel are placed between a pair of through-holes 25 into which the caulking portions 11c are inserted. With the use of such slits S, a narrow electrical path can be easily formed in the external terminal board 12, and by narrowing a width of the electrical path to be interrupted, the interruption can be performed easily. Further, the current interruption piece 20 can be easily downsized, so that the current interruption piece 20 can be easily displaced. Further, the external terminal board 12 is constituted by a first terminal strip A placed on a fastening-portion-4b side, a second terminal strip B placed on a terminal-13 side, and the current interruption piece 20 formed by narrowing the electrical path and connecting the first terminal strip A to the second terminal strip B.

A folding portion 30 and a vulnerable breaking portion 31 are provided between the pair of second slit portions 24 provided in parallel. The breaking portion 31 is provided in part of a peripheral edge of the current interruption piece 20 that serves as part of the electrical path, and is extended so as to interrupt the electrical path. The breaking portion 31 is extended perpendicularly to the reference axis L over the pair of second slit portions 24. The folding portion 30 extended in parallel with the breaking portion 31 is extended perpendicularly to the reference axis L over the pair of second slit portions 24.

The breaking portion 31 is placed on the terminal-13 side, and the folding portion 30 is placed on the fastening-portion-4b side. The breaking portion 31 is formed on a back surface of the external terminal board 12 as a linear groove having a V-shaped section, and the folding portion 30 is formed on a front surface of the external terminal board 12 as a linear groove having a V-shaped section. Thus, the rectangular current interruption piece 20 is formed of the parallel second slit portions 24, the breaking portion 31, and the folding portion 30.

The columnar load transmission portion 11d is placed so as to be sandwiched between the current interruption piece 20 in such a shape and the inversion plate 14 in the up-down direction. A top portion of the load transmission portion 11d is placed so as to abut with the back surface of the current interruption piece 20 near the breaking portion 31, and the caulking portions 11c are placed near the breaking portion 31. With such a configuration, it is possible to surely transmit a pushing-up force of the load transmission portion 11d to the breaking portion 31 by use of the caulking portions 11c as fixed points, thereby making it possible to surely break the breaking portion 31.

Next will be briefly described an operation of a current interruption mechanism P constituted by the current interruption piece 20, the inversion plate 14, and the load transmission portion 11d.

As illustrated in FIGS. 6 and 7, when a temperature inside the secondary battery 1 becomes high and a gas pressure inside the battery case 2 increases, the inversion plate 14 is pressed due to the gas pressure so as to project and curve in a projecting manner toward the external terminal board 12. Due to such a deformation, a load is transmitted to the current interruption piece 20 via the load transmission portion 11d. At this time, due to the pushing-up force of the load transmission portion 11d, the vulnerable breaking portion 31 forming part of the peripheral edge of the current interruption piece 20 breaks, so that the current interruption piece 20 is displaced to bend in a V-shape via the folding portion 30. Since the breaking portion 31 is placed in the middle of the electrical path, the breakage of the breaking portion 31 interrupts the electrical path of the external terminal board 12 in the middle, so that no current flows into the external terminal board 12. As a result, the secondary battery 1 is brought into an unusable state. Such a configuration can attain simplification of a structure to interrupt a current. Due to the simplification of the structure, malfunctions rarely occur even if the secondary battery 1 is used under vibrations.

The present invention is not limited to the above embodiment, and various modifications can be made within a gist of the invention. Note that, in the following embodiments, the same or equivalent constituent as/to that of the above embodiment has the same reference sign as in the above embodiment, and a detailed description thereof is omitted.

Figure 8:
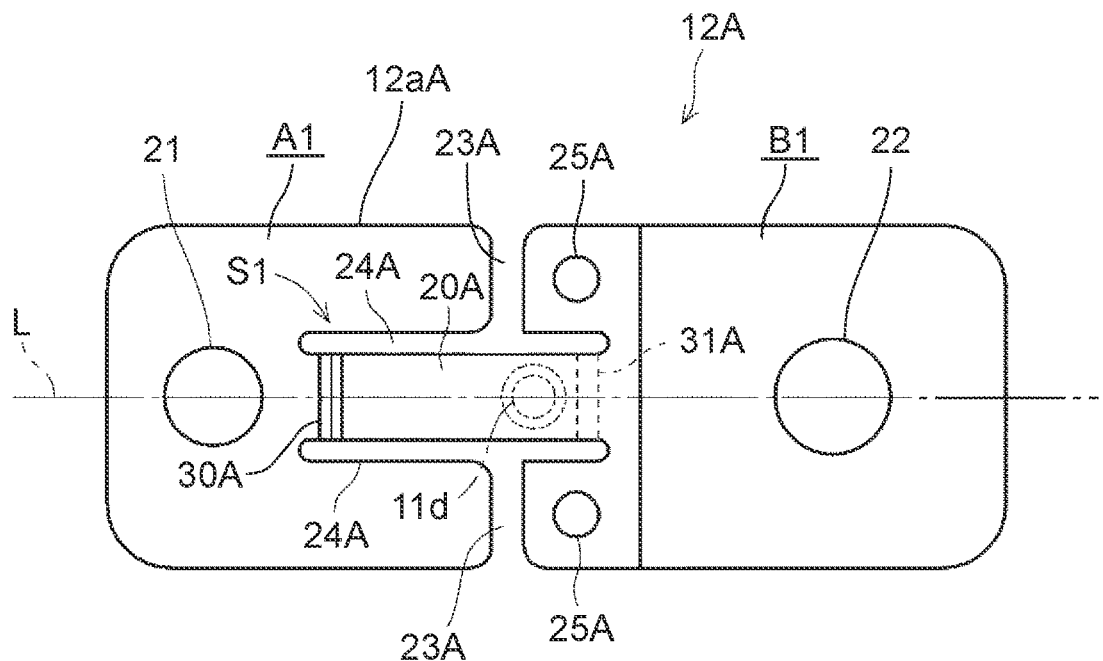
FIG. 8 is a plan view illustrating a first modification of the external terminal board.

As illustrated in FIG. 8, in an external terminal board 12A, T-shaped slits S1 are each constituted by a first slit portion 23A extended from a peripheral edge 12aA of the external terminal board 12A so as to be perpendicular to a reference axis L, and a second slit portion 24A extended in parallel with the reference axis L so as to communicate with an end portion of the first slit portion 23A and to extend across the end portion. The external terminal board 12A is constituted by a first terminal strip A1 placed on a fastening-portion-4b side, a second terminal strip B1 placed on a terminal-13 side, and a current interruption piece 20A formed by narrowing an electrical path and connecting the first terminal strip A1 to the second terminal strip B1. In one end of the current interruption piece 20A, a folding portion 30A is placed on a first-terminal-strip-A1 side, and in the other end of the current interruption piece 20A, a breaking portion 31A is placed on a second-terminal-strip-B1 side. The external terminal board 12A has a pair of through-holes 25A formed on the second-terminal-strip-B1 side.

Figure 9:
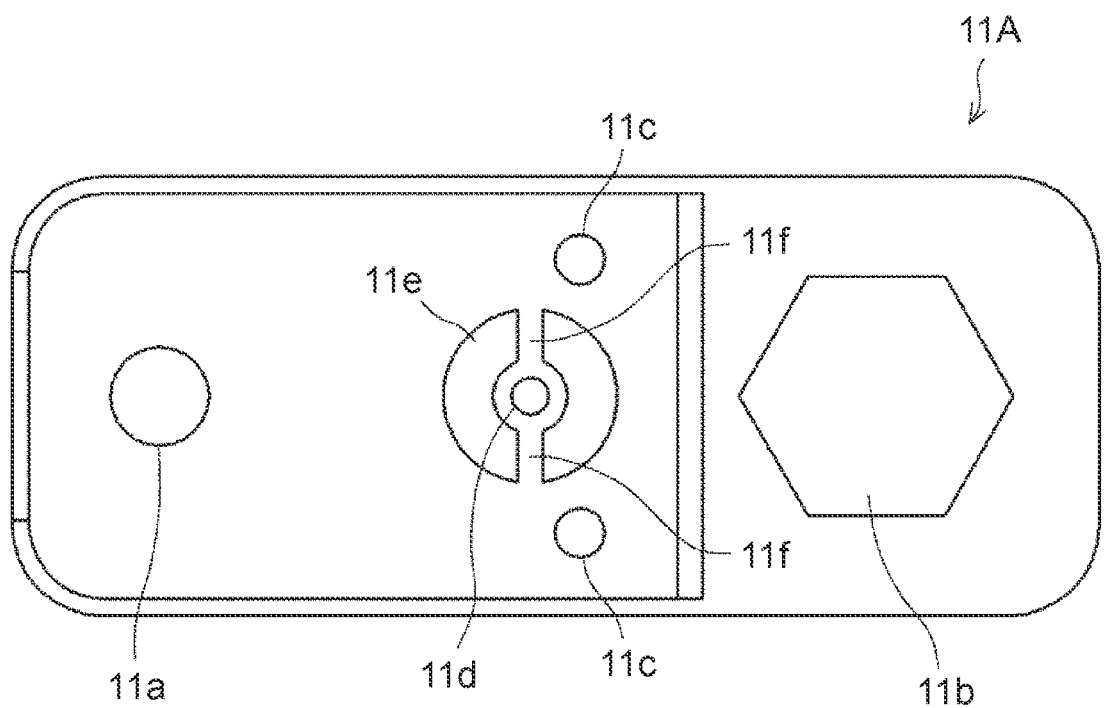
FIG. 9 is a plan view illustrating a first modification of the insulator.

As illustrated in FIG. 9, an insulator 11A is provided with caulking portions 11c to be inserted into the pair of through-holes 25A of the external terminal board 12A. Top portions of the caulking portions 11c are fixed to the external terminal board 12A near the slits S1 and the breaking portion 31A. A load transmission portion 11d is placed near the breaking portion 31A. Here, the "near" indicates a position at which the load transmission portion 11d transmits a load to the breaking portion 31A so as to break the breaking portion 31A.

Figure 10:
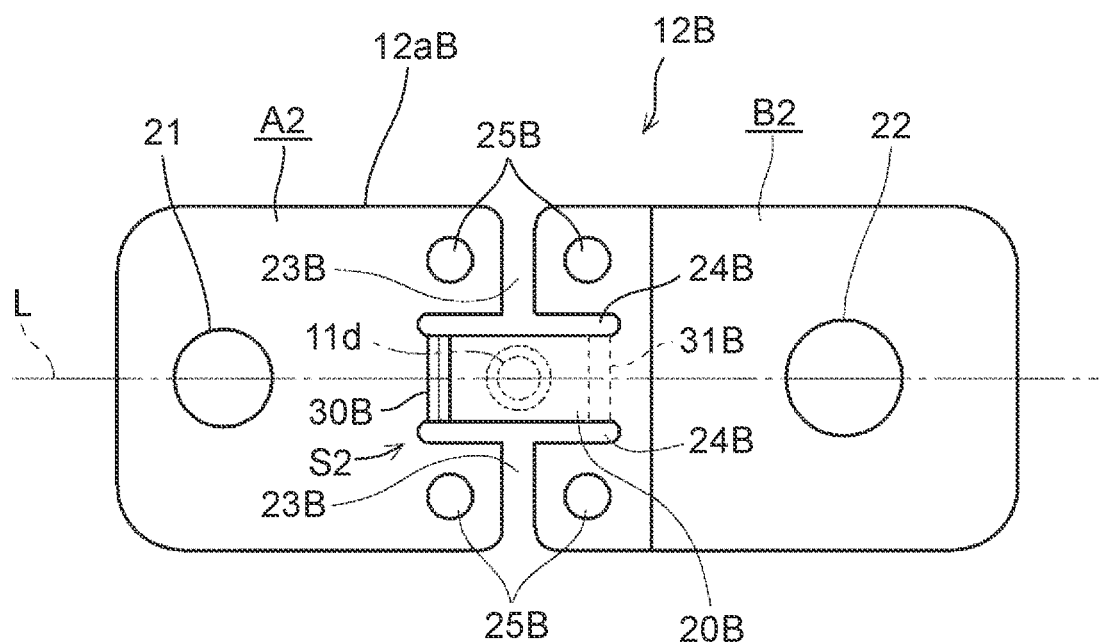
FIG. 10 is a plan view illustrating a second modification of the external terminal board.

As illustrated in FIG. 10, in an external terminal board 12B, T-shaped slits S2 are each constituted by a first slit portion 23B extended from a peripheral edge 12aB of the external terminal board 12B so as to be perpendicular to a reference axis L, and a second slit portion 24B extended in parallel with the reference axis L so as to communicate with an end portion of the first slit portion 23B and to extend across the end portion. Note that the second slit portion 24B is configured such that both parts extended toward opposite sides from the end portion of the first slit portion 23B have the same length. The external terminal board 12B can be constituted by a first terminal strip A2 placed on a fastening-portion-4b side, a second terminal strip B2 placed on a terminal-13 side, and a current interruption piece 20B formed by narrowing an electrical path in the middle and connecting the first terminal strip A2 to the second terminal strip B2. In one end of the current interruption piece 20B, a folding portion 30B is placed on a first-terminal-strip-A2 side, and in the other end of the current interruption piece 20B, a breaking portion 31B is placed on a second-terminal-strip-B2 side. The external terminal board 12B has two through-holes 25B formed on each of the first-terminal-strip-A2 side and the second-terminal-strip-B2 side.

Figure 11:
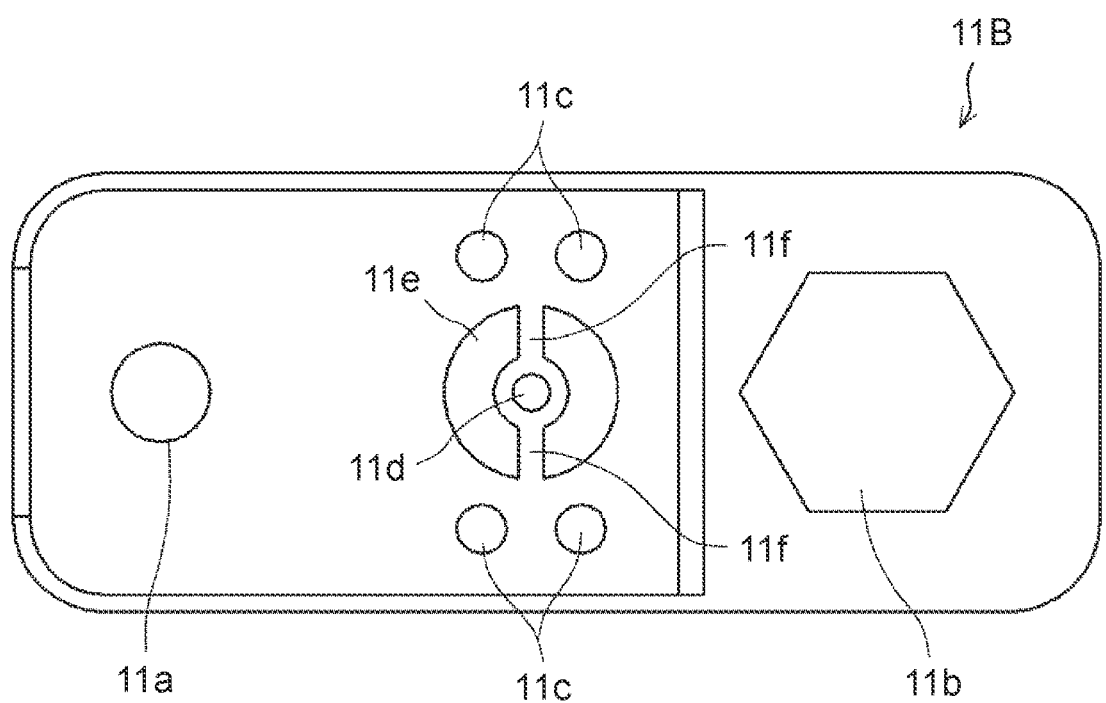
FIG. 11 is a plan view illustrating a second modification of the insulator.

As illustrated in FIG. 11, an insulator 11B is provided with four caulking portions 11c to be inserted into four through-holes 25B of the external terminal board 12B. Top portions of the caulking portions 11c are fixed to the external terminal board 12B near the slits S2, the folding portion 30B, and the breaking portion 31B. A load transmission portion 11d abuts with a back surface of the external terminal board 12B in a center between the folding portion 30B and the breaking portion 31B.

Figure 12:
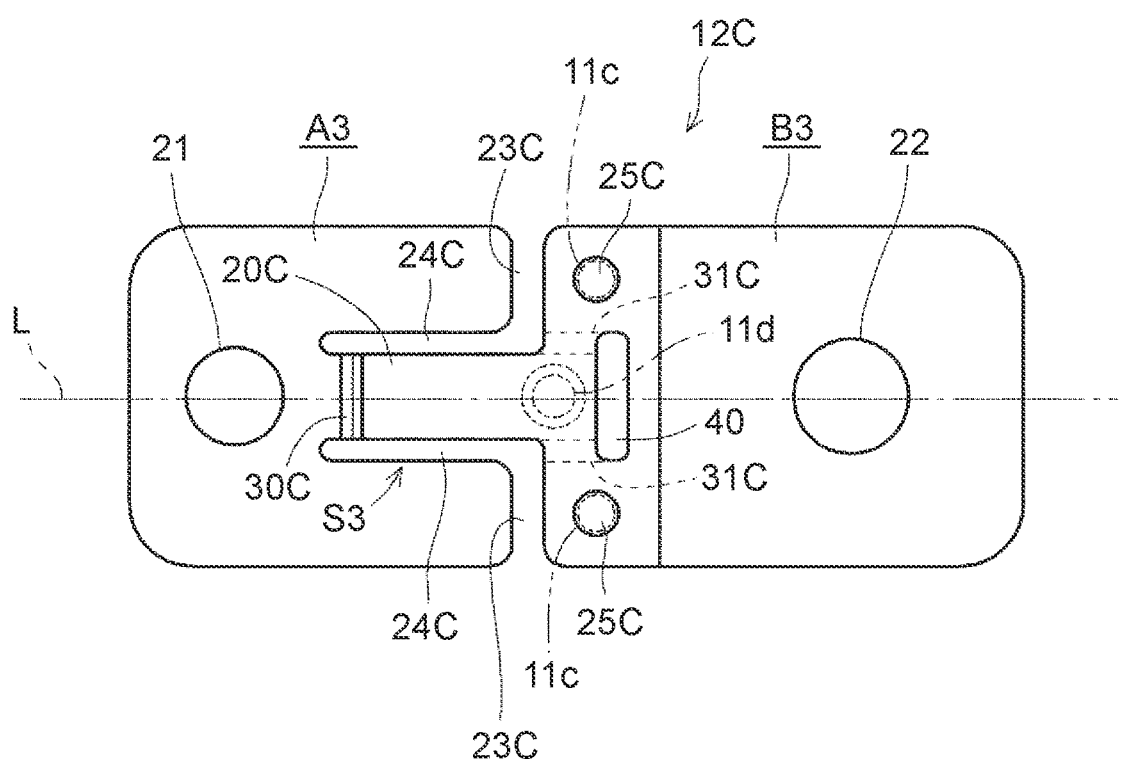
FIG. 12 is a plan view illustrating a third modification of the external terminal board.

As illustrated in FIG. 12, in an external terminal board 12C, a third slit portion 40 is provided on a reference axis L so as to be separated from second slit portions 24C and to be extended in parallel with first slit portions 23C. The third slit portion 40 is placed on a second-terminal-strip-B3 side. A breaking portion 31C is extended from an end portion of the third slit portion 40 to an end portion of the second slit portion 24C. A folding portion 30C extended in parallel with the third slit portion 40 is extended perpendicularly to the reference axis L over end portions of the pair of second slit portions 24C.

In one end of a current interruption piece 20C, the folding portion 30C is placed on a first-terminal-strip-A3 side, and in the other end of the current interruption piece 20C, the breaking portions 31C and the third slit portion 40 are placed on a second-terminal-strip-B3 side. Thus, the current interruption piece 20C is constituted by the second slit portions 24C, the third slit portion 40, the breaking portions 31C, and the folding portion 30C. A load transmission portion 11d is placed between the breaking portions 31C provided in pair. The slit S3 is constituted by the first, second, and third slit portions 23C, 24C, 40, and the top portions of the caulking portions 11c are inserted into respective through-holes 25C of the external terminal board 12C near the first and third slit portions 23C, 40, and caulked to be fixed to the external terminal board 12C.

The breaking portion and the folding portion formed in the external terminal board are modifiable variously. Note that, in the following description, a reference sign "50" is assigned to the external terminal board, a reference sign "60" is assigned to the folding portion, and a reference sign "70" is assigned to the breaking portion.

Figure 13A:
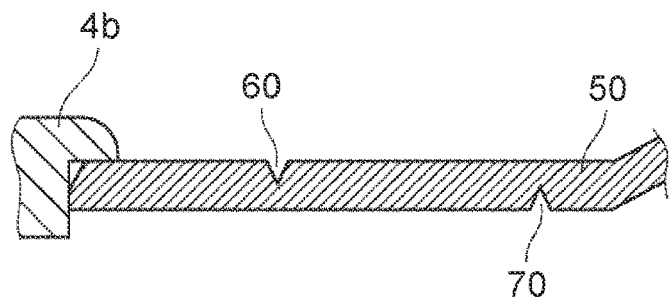
FIG. 13A is a sectional view illustrating a modification of a breaking portion and a folding portion.

As illustrated in FIG. 13A, the folding portion 60 may be formed on a front side of the external terminal board 50 and the breaking portion 70 may be formed on a back side thereof.

Figure 13B:
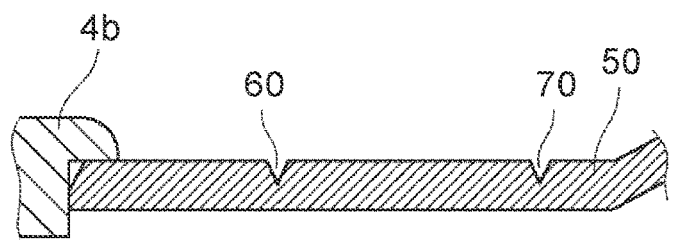
FIG. 13B is a sectional view illustrating a modification of the breaking portion and the folding portion.

As illustrated in FIG. 13B, the folding portion 60 and the breaking portion 70 may be formed on the front side of the external terminal board 50.

Figure 13C:
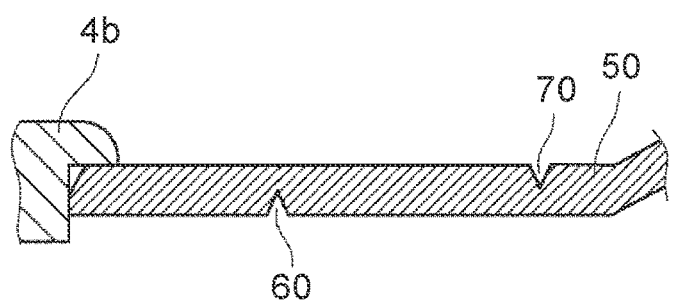
FIG. 13C is a sectional view illustrating a modification of the breaking portion and the folding portion.

As illustrated in FIG. 13C, the folding portion 60 may be formed on the back side of the external terminal board 50 and the breaking portion 70 may be formed on the front side thereof.

Figure 13D:
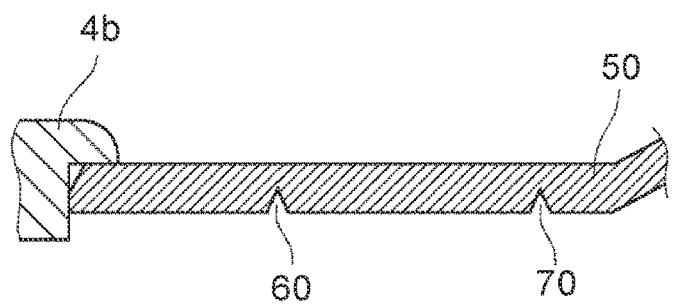
FIG. 13D is a sectional view illustrating a modification of the breaking portion and the folding portion.

As illustrated in FIG. 13D, the folding portion 60 and the breaking portion 70 may be formed on the back side of the external terminal board 50.

Figure 14D:
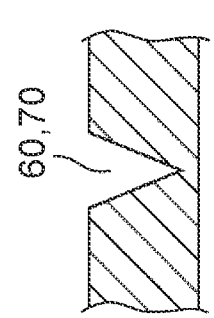
FIG. 14D is a sectional view illustrating a modification of the breaking portion and the folding portion.
Figure 14C:
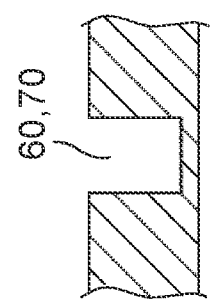
FIG. 14C is a sectional view illustrating a modification of the breaking portion and the folding portion.
Figure 14B:
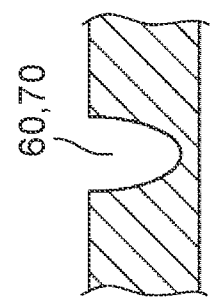
FIG. 14B is a sectional view illustrating a modification of the breaking portion and the folding portion.
Figure 14A:
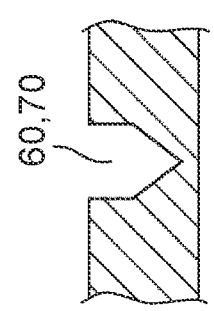
FIG. 14A is a sectional view illustrating a modification of the breaking portion and the folding portion.

As illustrated in FIG. 14A, the folding portion 60 and the breaking portion 70 may have a V-shaped section.

As illustrated in FIG. 14B, the folding portion 60 and the breaking portion 70 may have a rectangular section.

As illustrated in FIG. 14C, the folding portion 60 and the breaking portion 70 may have a U-shaped section.

As illustrated in FIG. 14D, the folding portion 60 and the breaking portion 70 may have a pentagonal section.

As illustrated in FIG. 15A, the folding portion 60 and the breaking portion 70 may be extended perpendicularly to the reference axis L in a plan view.

As illustrated in FIG. 15B, the folding portion 60 and the breaking portion 70 may be extended in a V-shape across the reference axis L in a plan view.

As illustrated in FIG. 15C, the folding portion 60 and the breaking portion 70 may be extended in a C-shape across the reference axis L in a plan view.

As illustrated in FIG. 15D, the folding portion 60 and the breaking portion 70 may be extended to diagonally intersect with the reference axis L in a plan view.

The current interruption mechanism P may be provided in at least one of the cathode side and the anode side.

Figure 16A:
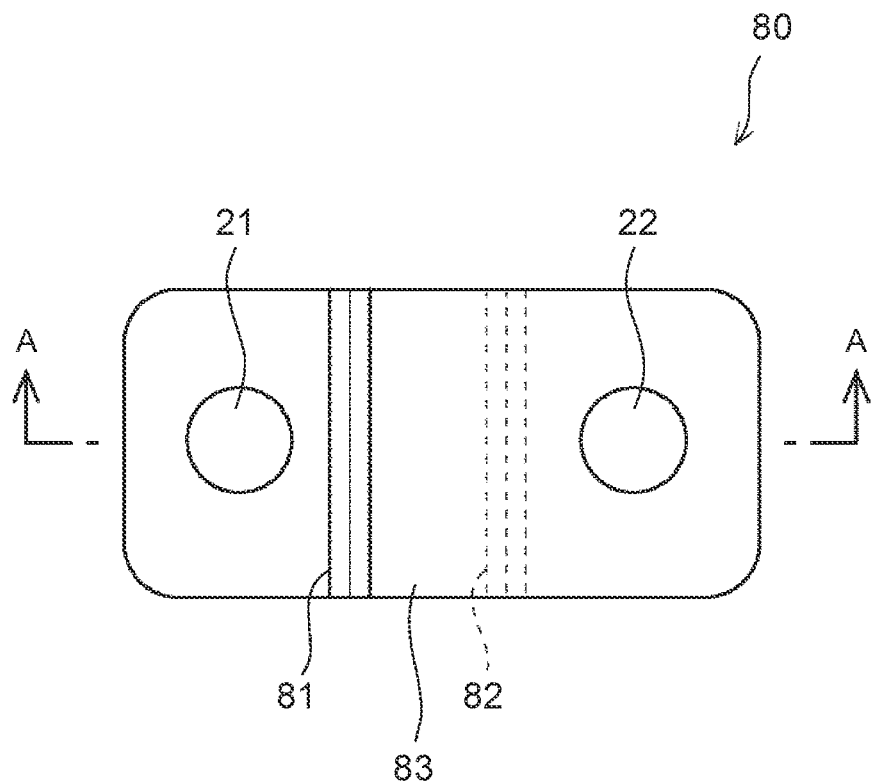
FIG. 16A is a plan view illustrating a fourth modification of the external terminal board.
Figure 16B:
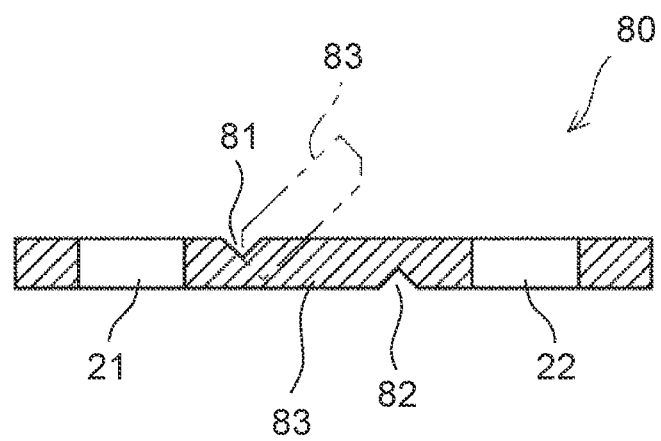
FIG. 16B is a sectional view taken along a line A-A in FIG. 16A.

As illustrated in FIGS. 16A and 16B, an external terminal board 80 is provided with a current interruption piece 83 between a through-hole 21 and a through-hole 22. The current interruption piece 83 is constituted by a folding portion 81 extended on a front side so as to form a V-groove, and a breaking portion 82 extended on a back side so as to form a V-groove. The folding portion 81 and the breaking portion 82 parallel to each other are extended over two parallel sides of the external terminal board 80 having a rectangular shape.

Figure 17:
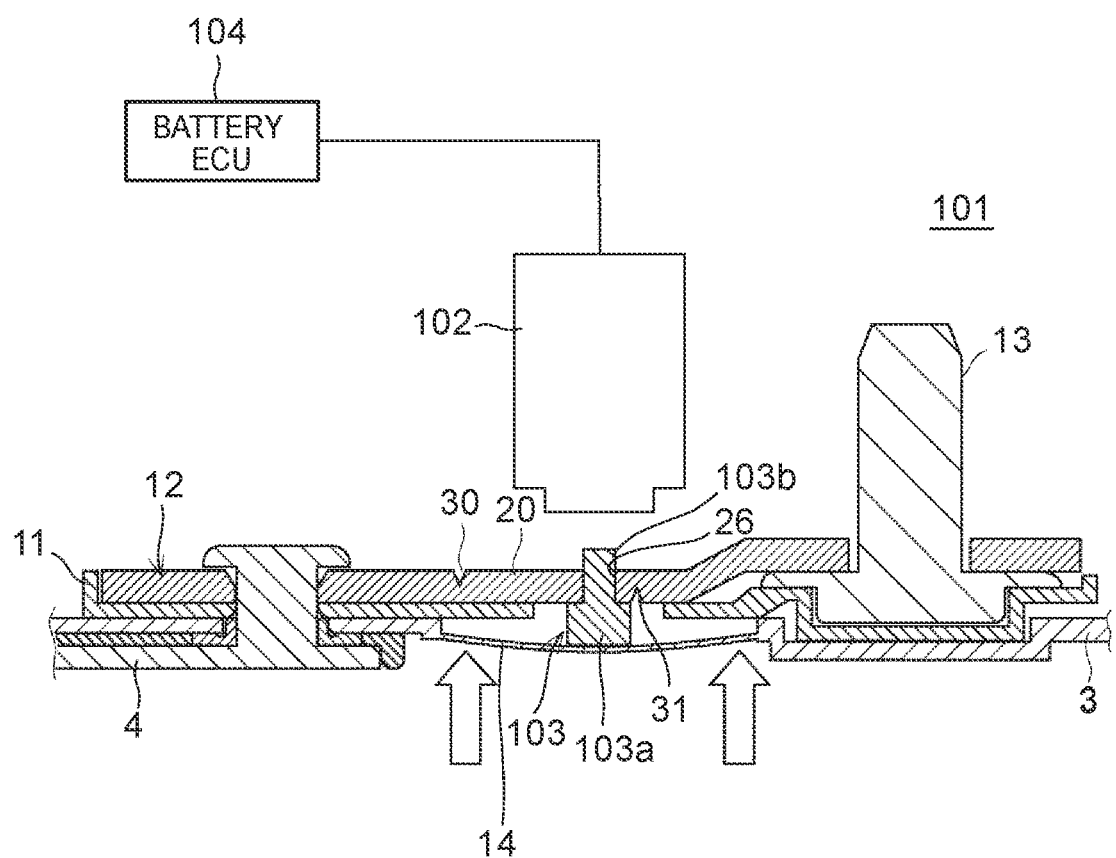
FIG. 17 is a sectional view illustrating a peripheral part of a current interruption mechanism in another secondary battery.

Here, as illustrated in FIG. 17, it is preferable that a secondary battery 101 include a malfunction detection portion 102 for detecting the abovementioned current interruption. The malfunction detection portion 102 is a load cell or a tactile sensor, for example, and is fixed to an external case (not shown). A load transmission portion 103 includes a pushing-up portion 103a that makes contact with a current interruption piece 20 of an external terminal board 12 so as to push the current interruption piece 20 upward (outward), and a projecting portion 103b projecting upward through a through-hole 26 formed in the current interruption piece 20.

The pushing-up portion 103a projects laterally from a lower edge of the projecting portion 103b. In a state where a breaking portion 31 of the current interruption piece 20 does not break, the pushing-up portion 103a is set to have a height that causes a bottom face of a projecting part of the pushing-up portion 103a to generally make contact with a top face of an inversion plate 14 and also causes a top face thereof to generally make contact with a back surface of the current interruption piece 20. Note that the height of the pushing-up portion 103a can be changed appropriately according to a deformation amount (that is, a gas pressure inside the secondary battery 101) of the inversion plate 14 at the time when the breaking portion 31 of the current interruption piece 20 is broken.

The projecting portion 103b is extended in a direction generally perpendicular to the top face of the projecting part of the pushing-up portion 103a, and in FIG. 17, the projecting portion 103b projects upward from the top face of the pushing-up portion 103a. The projecting portion 103b is set to have a height that causes the projecting portion 103b to successfully comes into contact with the malfunction detection portion 102 at the time when the breaking portion 31 of the current interruption piece 20 breaks, which will be described later in detail. Further, the projecting portion 103b is set to have a thickness that allows the projecting portion 103b to be inserted into the through-hole 26 of the current interruption piece 20.

Figure 18:
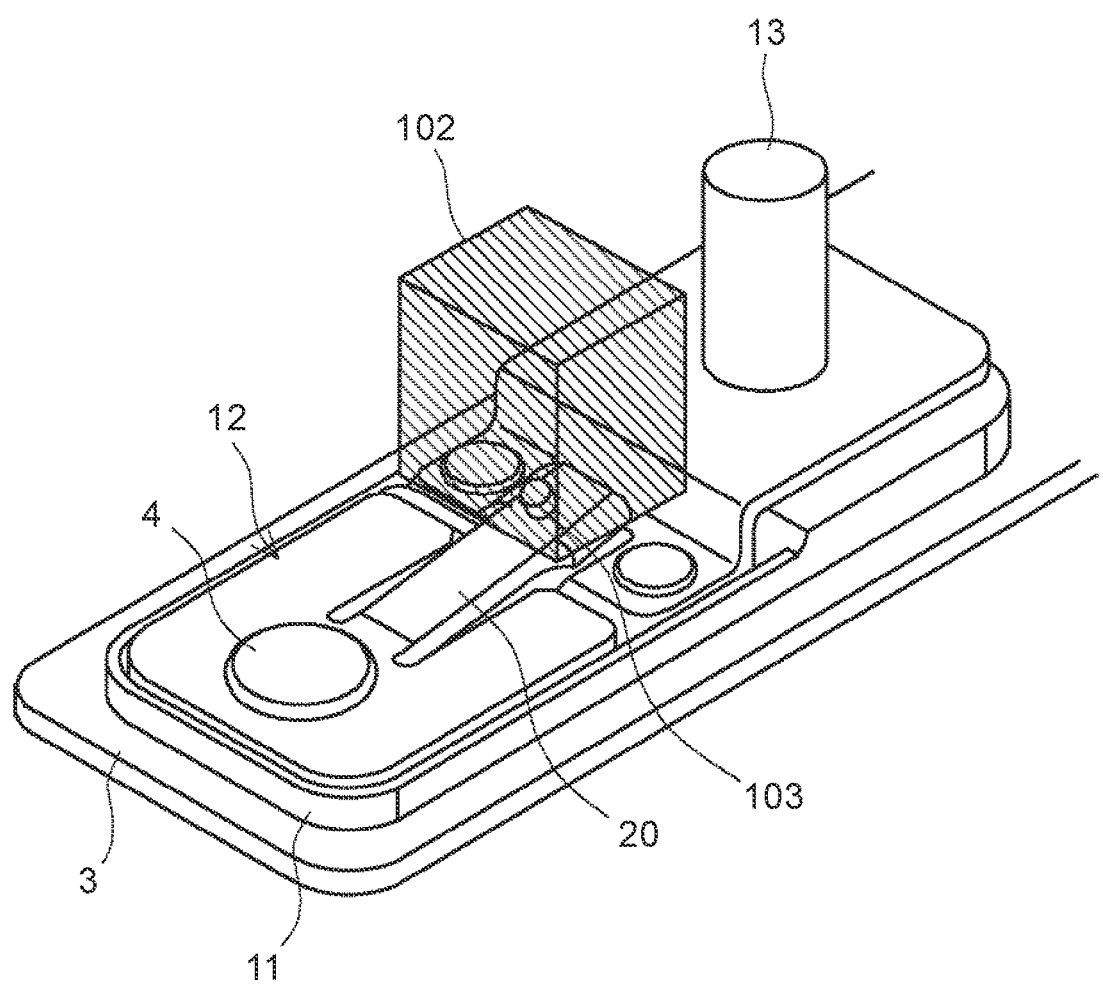
FIG. 18 is a perspective view illustrating a peripheral part of the current interruption mechanism in the another secondary battery.
Figure 19:
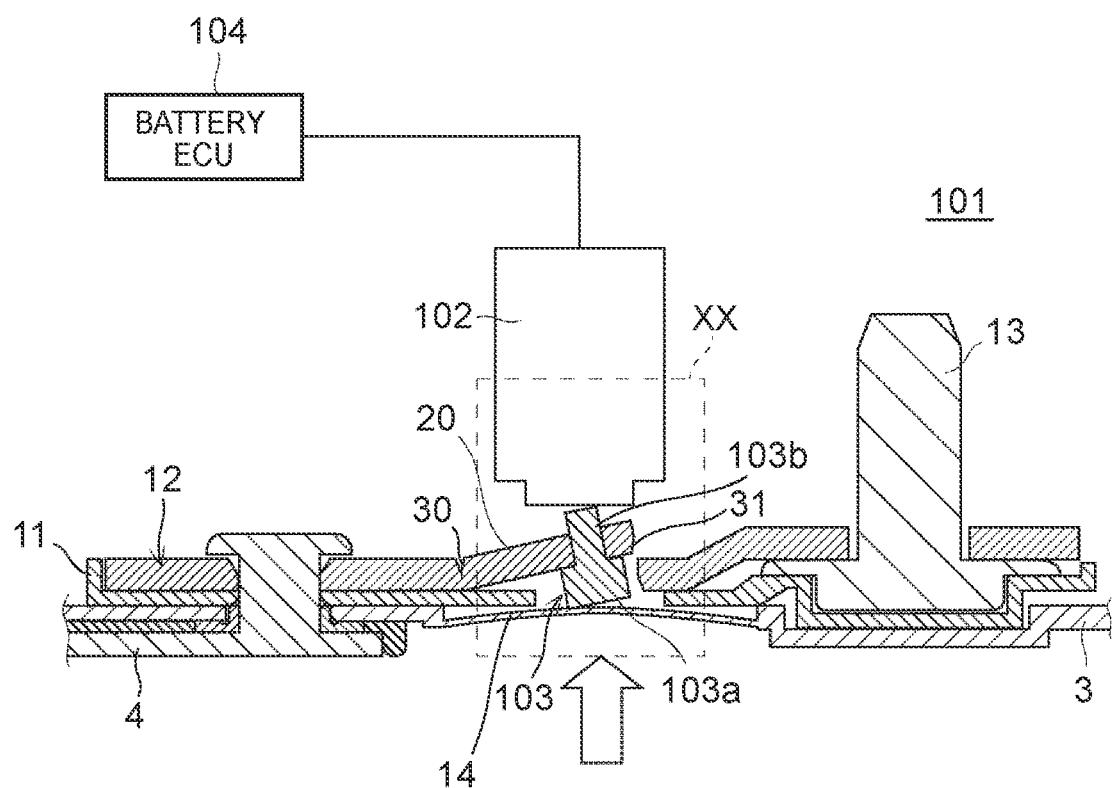
FIG. 19 is a sectional view illustrating a peripheral part of the current interruption mechanism in the another secondary battery.
Figure 20:
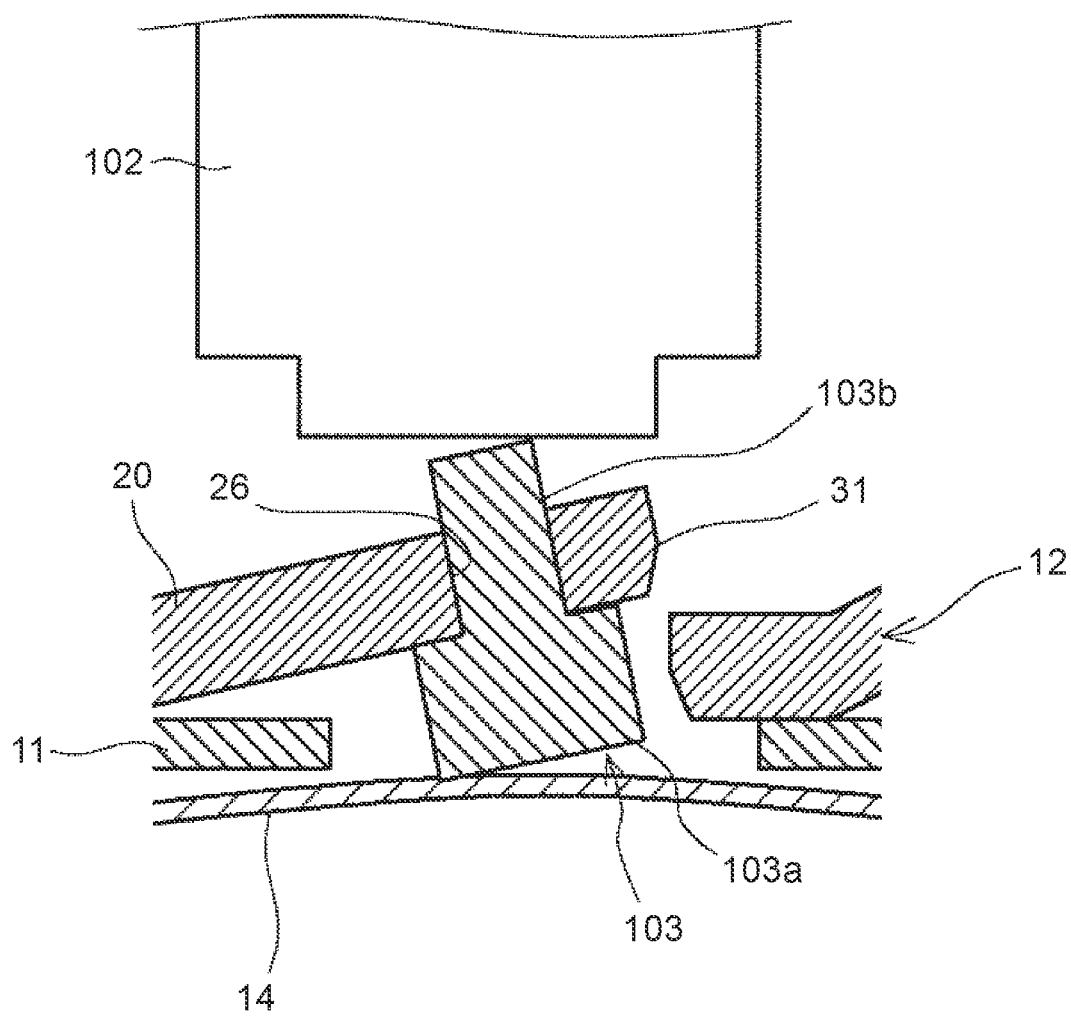
FIG. 20 is an enlarged view of a XX part in FIG. 19.

In such a configuration, as illustrated in FIGS. 18 to 20, when the inversion plate 14 is pressed and deformed by a gas pressure so as to push up the load transmission portion 103, the pushing-up portion 103a of the load transmission portion 103 pushes up the current interruption piece 20, so that the breaking portion 31 breaks to interrupt a current path. An upper end of the projecting portion 103b of the load transmission portion 103 thus pushed up comes into contact with the malfunction detection portion 102. Hereby, the malfunction detection portion 102 outputs, to a battery ECU (Electronic Control Unit) 104, for example, a detection signal indicating that the upper end of the projecting portion 103b of the load transmission portion 103 comes into contact therewith (that is, a detection signal indicating that current interruption occurs). Based on the detection signal thus input, the battery ECU 104 recognizes that the current interruption has occurred, and stops charging. Note that FIG. 18 illustrates a state where the malfunction detection portion 102 is seen through so that a configuration around the current interruption piece 20 is clearly observed.

Thus, the malfunction detection portion 102 can instantly detect the occurrence of the current interruption, and based on a detection result, the charging can be stopped, for example. This makes it possible to restrain an overcharge state inside the secondary battery 101 due to the current flowing into a part broken after the current interruption.

Figure 21:
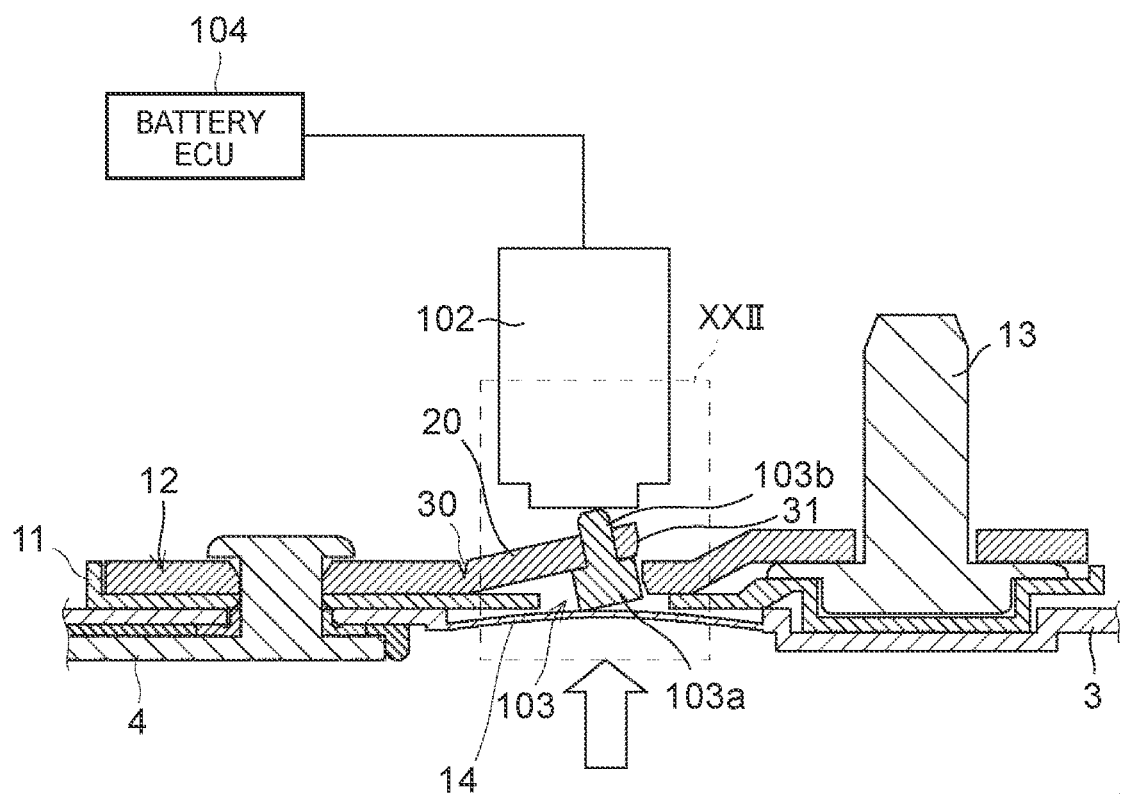
FIG. 21 is a sectional view illustrating a peripheral part of a current interruption mechanism in further another secondary battery.
Figure 22:
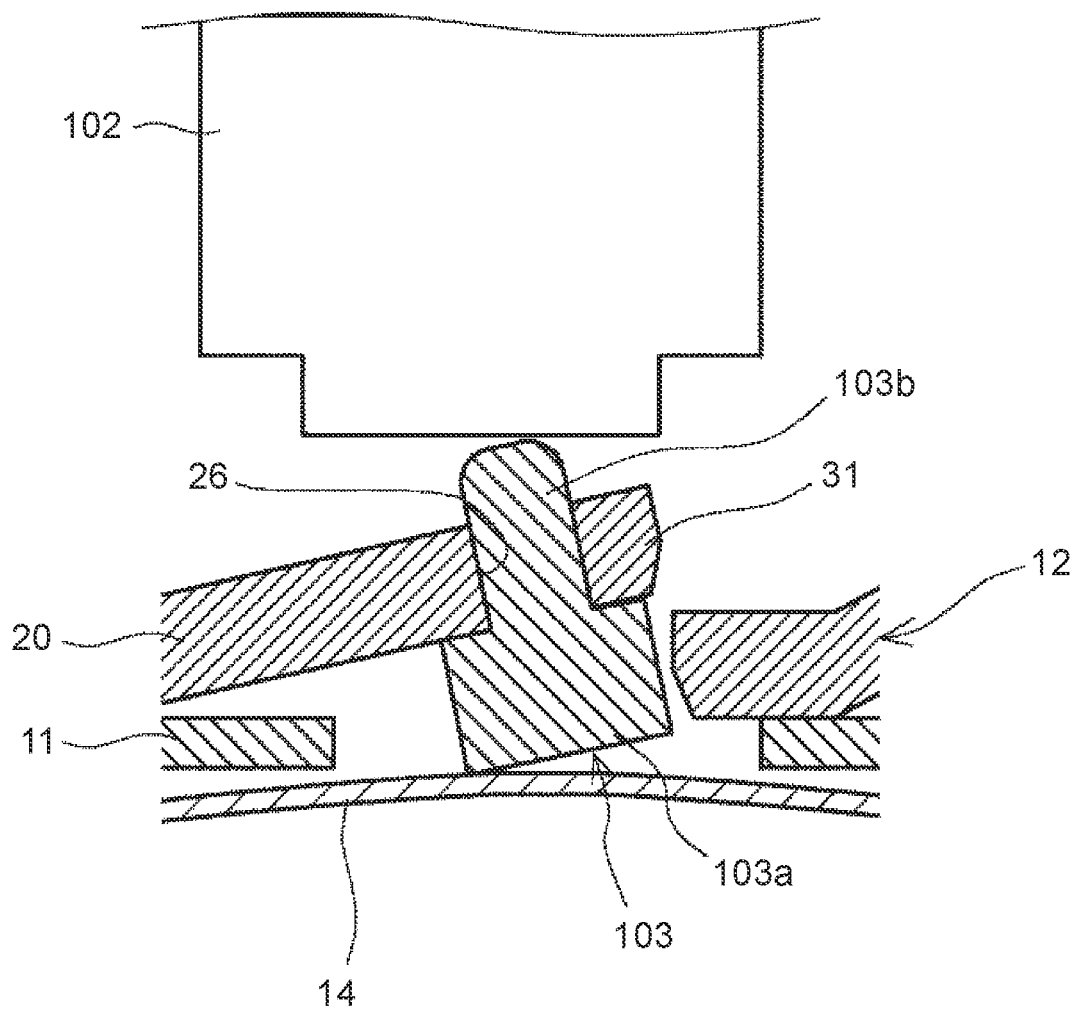
FIG. 22 is an enlarged view of a XXII part in FIG. 21.

Note that, as illustrated in FIGS. 21 and 22, it is preferable that a corner portion of an upper end of the projecting portion 103b of the load transmission portion 103 be chamfered in a round shape. Hereby, the upper end of the projecting portion 103b of the load transmission portion 103 can successfully come into contact with the malfunction detection portion 102.

In the embodiment illustrated in FIG. 17 and so on, the upper end of the projecting portion 103b of the load transmission portion 103 comes into contact with the malfunction detection portion 102, but the breaking portion 31 of the current interruption piece 20 may come into contact with the malfunction detection portion 102.

Figure 23:
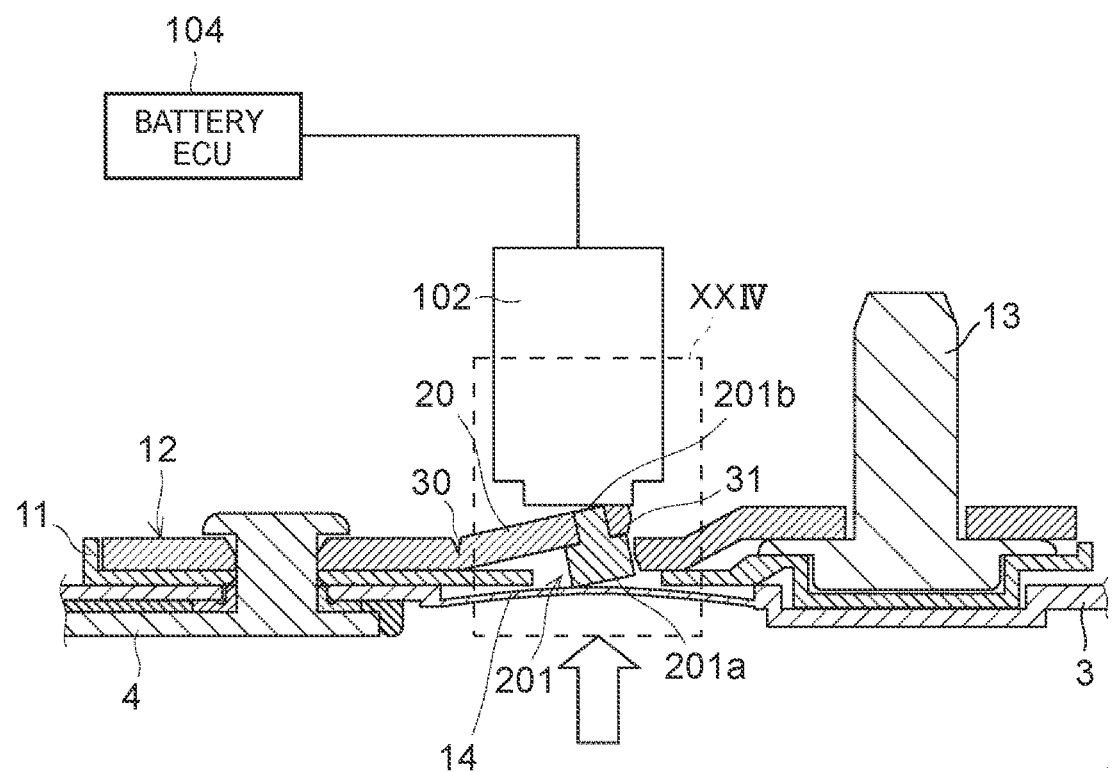
FIG. 23 is a sectional view illustrating a peripheral part of a current interruption mechanism in further another secondary battery.
Figure 24:
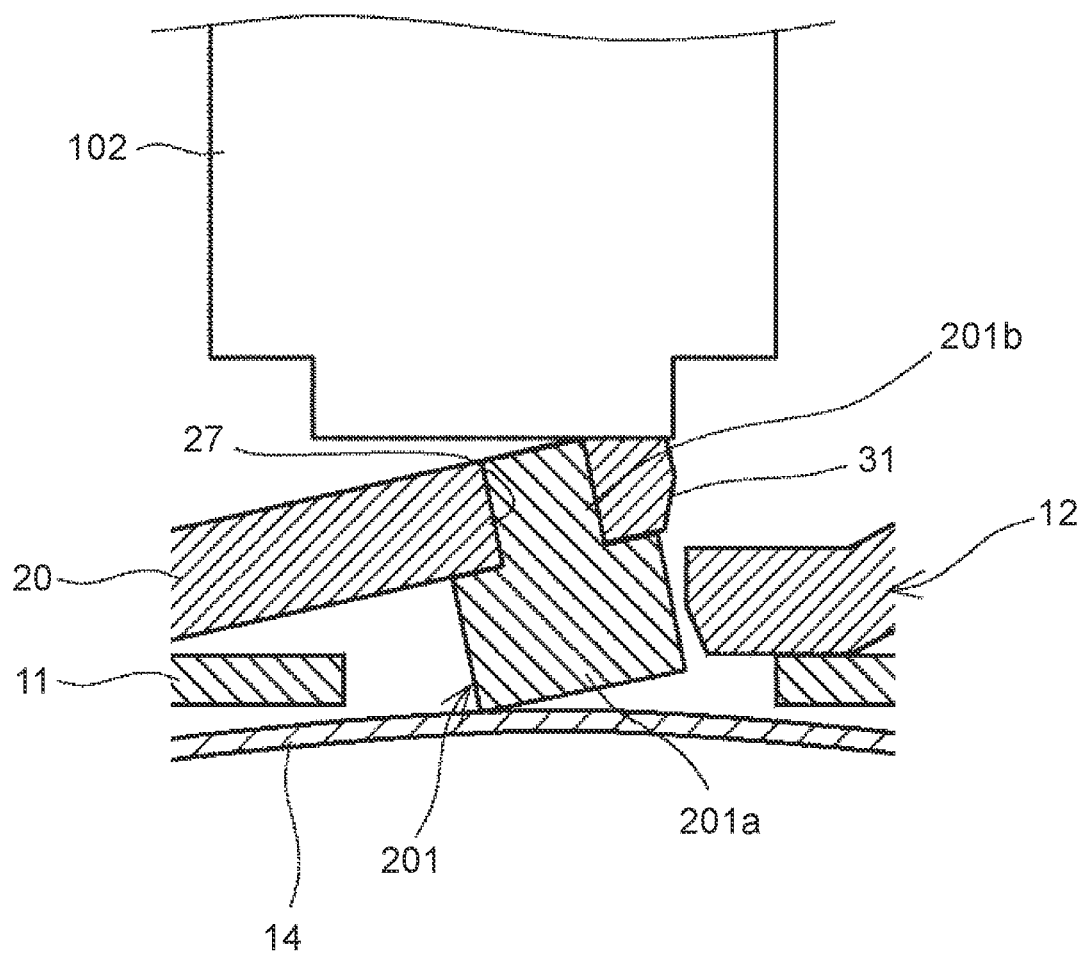
FIG. 24 is an enlarged view of a XXIV part in FIG. 23.

In this case, as illustrated in FIGS. 23 and 24, a load transmission portion 201 includes a pushing-up portion 201a that makes contact with a current interruption piece 20 of an external terminal board 12 so as to push the current interruption piece 20 upward, and an insertion portion 201b inserted into a through-hole 27 formed in the current interruption piece 20. Here, an upper end of the insertion portion 201b hardly projects from a top face of the current interruption piece 20.

In such a configuration, when an inversion plate 14 is pressed and deformed by a gas pressure so as to push up the load transmission portion 201, the pushing-up portion 201a of the load transmission portion 201 pushes up the current interruption piece 20, so that a breaking portion 31 breaks to interrupt a current path. Then, the current interruption piece 20 rotates around a folding portion 30 so that the breaking portion 31 of the current interruption piece 20 comes into contact with a malfunction detection portion 102. Hereby, the malfunction detection portion 102 outputs, to a battery ECU 104, for example, a detection signal indicating that the breaking portion 31 of the current interruption piece 20 comes into contact therewith (that is, a detection signal indicating that current interruption occurs). Based on the detection signal thus input, the battery ECU 104 recognizes that the current interruption has occurred, and stops charging.

Note that, in the embodiment of FIGS. 23 and 24, the load transmission portion 201 having the insertion portion 201b is used, but the embodiment can be performed similarly with the use of the other load transmission portions described above. Further, the embodiment can be performed similarly with the use of the other external terminal boards described above, as the external terminal board.

What is claimed is:

1. A secondary battery comprising:
an external terminal board placed on a cover portion of a battery case via an insulator, the external terminal board having an electrical path that is conductive from a collector terminal inside the battery case to a terminal;
a first displacement portion provided in the cover portion and displaceable so as to project toward the external terminal board at a predetermined pressure inside the battery case;
a second displacement portion provided in the external terminal board and projectable outward so as to interrupt the electrical path; and
a load transmission portion placed between the first displacement portion and the second displacement portion and configured to transmit displacement of the first displacement portion to the second displacement portion,
wherein the load transmission portion is made of an insulating material and is provided integrally with the insulator, and
a lower surface of the second displacement portion abuts an uppermost surface of the load transmission portion.

2. The secondary battery according to claim 1, wherein the second displacement portion includes a vulnerable breaking portion extended on the external terminal board so as to interrupt the electrical path.

3. The secondary battery according to claim 1, wherein:
the insulator is fixed to the external terminal board via a caulking portion; and
the load transmission portion is placed near the breaking portion.

4. The secondary battery according to claim 1, wherein the second displacement portion is formed to be smaller than a width of the external terminal board due to slit portions extended from an outer periphery of the external terminal board.

5. The secondary battery according to claim 1, wherein:
a fastening portion electrically connected to the collector terminal inside the battery case is fixed to the external terminal board;
the terminal projecting outside is connected to the external terminal board;
the second displacement portion placed between the fastening portion and the terminal is formed in the external terminal board and constituted by first slit portions extended from a peripheral edge of the external terminal board so as to be perpendicular to a reference axis that passes through the fastening portion and the terminal, and second slit portions extended in parallel with the reference axis so as to communicate with respective first slit portions; and
the first slit portions and the second slit portions are placed in pairs in a mirror symmetrical manner across the reference axis.

6. The secondary battery according to claim 5, wherein:
a breaking portion is extended perpendicularly to the reference axis over the pair of second slit portions;
a folding portion extended in parallel with the breaking portion is extended perpendicularly to the reference axis over the pair of second slit portions; and
the second displacement portion is constituted by the first slit portions, the second slit portions, the breaking portion, and the folding portion.

7. The secondary battery according to claim 5, further comprising
a third slit portion provided on the reference axis so as to be separated from the second slit portions and to be extended in parallel with the first slit portions, wherein:
a breaking portion is extended from an end portion of the third slit portion to an end portion of the second slit portion;
a folding portion extended in parallel with the third slit portion is extended perpendicularly to the reference axis over the pair of second slit portions; and
the second displacement portion is constituted by the first slit portions, the second slit portions, the third slit portion, the breaking portion, and the folding portion.

8. The secondary battery according to claim 1, wherein the first displacement portion is provided integrally with the cover portion.

9. A secondary battery comprising:
an external terminal board placed on a cover portion of a battery case via an insulator, the external terminal board having an electrical path that is conductive from a collector terminal inside the battery case to a terminal;
a first displacement portion provided in the cover portion and displaceable so as to project toward the external terminal board at a predetermined pressure inside the battery case;
a second displacement portion provided in the external terminal board and projectable outward so as to interrupt the electrical path;
a load transmission portion placed between the first displacement portion and the second displacement portion and configured to transmit displacement of the first displacement portion to the second displacement portion; and a malfunction detection portion, wherein:

the load transmission portion includes a pushing-up portion that makes contact with a lower surface of the second displacement portion so as to push up the second displacement portion, and a projecting portion that projects outward through a through-hole formed in the second displacement portion; and when the load transmission portion is pushed up due to displacement of the first displacement portion such that the second displacement portion projects outward so as to interrupt the electrical path, the projecting portion comes into contact with the malfunction detection portion.

10. A secondary battery comprising:

an external terminal board placed on a cover portion of a battery case via an insulator, the external terminal board having an electrical path that is conductive from a collector terminal inside the battery case to a terminal;

a first displacement portion provided in the cover portion and displaceable so as to project toward the external terminal board at a predetermined pressure inside the battery case;

a second displacement portion provided in the external terminal board and projectable outward so as to interrupt the electrical path;

a load transmission portion placed between the first displacement portion and the second displacement portion and configured to transmit displacement of the first displacement portion to the second displacement portion; and a malfunction detection portion, wherein:

the load transmission portion includes a pushing-up portion that makes contact with a lower surface of the second displacement portion so as to push up the second displacement portion, and a projecting portion that projects outward through a through-hole formed in the second displacement portion, when the second displacement portion projects outward so as to interrupt the electrical path, the second displacement portion comes into contact with the malfunction detection portion.

\* \* \* \* \*